United States Patent [19]

Emura et al.

[11] Patent Number: 4,577,004

[45] Date of Patent: Mar. 18, 1986

[54] PROCESS FOR PRODUCING A CHLOROPRENE POLYMER

[75] Inventors: Noriaki Emura; Takashi Ariyoshi; Toshikazu Kato, all of Yamaguchi, Japan

[73] Assignee: Toyo Soda Manufacturing Co., Ltd., Yamaguchi, Japan

[21] Appl. No.: 681,736

[22] Filed: Dec. 14, 1984

[30] Foreign Application Priority Data

Dec. 15, 1983 [JP] Japan .................................. 58-235047

[51] Int. Cl.[4] ...................... C07C 107/08; C09B 29/20
[52] U.S. Cl. .................................. 526/204; 526/295; 526/222
[58] Field of Search ................... 526/204, 295, 222

[56] References Cited

U.S. PATENT DOCUMENTS 2,259,122 1/1940 Walker ................................ 526/295

Primary Examiner—John Kight
Assistant Examiner—M. L. Moore
Attorney, Agent, or Firm—Sughrue, Mion, Zinn, Macpeak, and Seas

[57] ABSTRACT

A chloroprene polymer is produced by aqueous emulsion polymerization in the presence of a cyclic polysulfide compound which is employed in a quantity equal to at least 0.1% by weight of the weight of the chloroprene, followed by deflocculating the polymer.

13 Claims, No Drawings

PROCESS FOR PRODUCING A CHLOROPRENE POLYMER

FIELD OF THE INVENTION

This invention relates to a process for producing a chloroprene polymer having high strength and heat resistance.

BACKGROUND OF THE INVENTION

The chloroprene polymers are generally classified into those of the type modified by sulfur and those of the type not modified by sulfur, depending on the chain transfer agent which is used for their production. The chloroprene polymers of the former type, which employ sulfur as a chain transfer agent, can be vulcanized by a metal oxide alone, without the aid of any organic vulcanization accelerator of, for example, the thiuram type. It is known that such vulcanized polymers have good mechanical properties and adhesiveness to other materials, but are inferior to the chloroprene polymers of the latter type in thermal aging resistance. It is also known that the chloroprene polymers of the latter type, which employ a mercaptan or xanthogen compound as a chain transfer agent, have good heat resistance, but are inferior to the chloroprene polymers of the former type in tensile strength and other mechanical properties.

In order to obtain vulcanized chloroprene polymers of the latter type having good physical properties, it is necessary to use an organic vulcanization accelerator, such as ethylene thiourea. Ethylene thiourea is now used more often than any other vulcanization accelerator. It is, however, suspected of being a cancer-causing substance and it is possible that its use may be prohibited sooner or later. The development of a vulcanization accelerator to replace ethylene thiourea has, therefore, been studied, but there has not yet been found any vulcanization accelerator that is superior to ethylene thiourea.

There is, therefore, a strong desire for the development of a chloroprene polymer which provides a vulcanized product having good mechanical properties and heat resistance without using any organic vulcanization accelerator.

Cyclic polysulfide compounds have drawn attention as compounds having physiological activity, and are known to be useful as cross-linking agents replacing sulfur, and as monomers for forming polysulfide polymers.

SUMMARY OF THE INVENTION

It is an object of this invention to produce a chloroprene polymer which provides a vulcanized product having good mechanical properties and thermal aging resistance, without using any organic vulcanization accelerator.

This object is attained by a process for producing a chloroprene polymer, comprising subjecting chloroprene to aqueous emulsion polymerization in the presence of a cyclic polysulfide compound which is present in a quantity equal to at least 0.1% by weight of the weight of said chloroprene, and deflocculating the resulting polymer.

The chloroprene polymer produced by the method of this invention can be vulcanized by a metal oxide alone without using any organic vulcanization accelerator, and the vulcanized product has high thermal aging resistance and strength.

DETAILED DESCRIPTION OF THE INVENTION

The "chloroprene" used for the aqueous emulsion polymerization of this invention means chloroprene alone or a mixture of chloroprene and a monomer which is copolymerizable with chloroprene. Examples of the copolymerizable monomers include 2,3-dichlorobutadiene, 1-chlorobutadiene, butadiene, isoprene, 2-cyanobutadiene, acrylic acid, methacrylic acid, methyl methacrylate, and acrylonitrile. The mixture may usually contain up to 30% by weight of any such copolymerizable monomer.

The aqueous emulsion polymerization is performed in the presence of a cyclic polysulfide compound, for example, and preferably, 1,2-dithiane, 1,2,3-trithiane, 1,2,3,4-tetrathiacyclohexane, 1,2,3-trithia-6,9,12-trioxytetradecane, 1,2,3-trithia-6,9-dioxycycloundecane, 1,2,3-trithia-6-oxycyclooctane, 1,2-dithia-5,8,11-trioxycyclododecane, 1,2,3,4-tetrathia-7,10,13-trioxycyclopentadecane, 1,2,3,4,5-pentathia-8,11,14-trioxycyclohexadecane, or 1,2,3,4,5,6-hexathia-9,12,15-trioxycycloheptadecane. In order to ensure the ease of production of a polymer having appropriate viscosity by deflocculation and its heat resistance, it is preferable to use a cyclic polysulfide compound of formula (I)

wherein x is an integer of from 3 to 5, and R is a unit having at its terminals carbon atoms bonded to sulfur atoms, maintaining a certain distance therebetween and serving to remove substantially the instability of the cyclic polysulfide compound which is due to the three-dimensional strain of the ring. The cyclic polysulfide compound is added to the extent that the quantity of sulfur which it contains may be at least 0.1% by weight of chloroprene. It is preferably employed in a quantity of from 0.1 to 10% by weight of the weight of the chloroprene.

An emulsifier may be prepared from one or more substances selected from among, for example, water-soluble, and especially alkali metal, salts of long chain fatty acids, rosins or rosin derivatives such as wood rosin, tall oil rosin, disproportionated rosin or partially polymerized rosin, long chain alkylsulfonic acids and the condensation products of naphthalenesulfonic acids and formaldehyde, or other anionic surface active agents, or nonionic surface active agents such as polyoxyethylenenonylphenol ether.

Potassium persulfate, ammonium persulfate, hydrogen peroxide or t-butylhydroperoxide may, for example, be used as a catalyst for starting polymerization. It is one of the advantages of this invention that it is sufficient to use a smaller amount of catalyst than for polymerization in the presence of sulfur in the elemental form.

The monomers in which an appropriate amount of a cyclic polysulfide is dissolved are mixed with an aqueous emulsion containing an emulsifier. The mixture is subjected to polymerization under stirring at a temperature of 0° C. to 70° C. in a polymerization system having a pH value of 7 to 13 in the presence of a catalyst.

A polymerization inhibitor is added to stop polymerization if a polymerization degree of, say, 65 to 95% has been reached. The inhibitor may be selected from, for example, the water-soluble salts of thiodiphenylamine, 4-tert-butylcatechol, 2,2'-methylenebis-4-methyl-6-tert-butylphenol and dialkyldithiocarbamic acid. It is sufficient to add 0.01 to 2.0% by weight of the inhibitor.

The resulting polymer is insoluble in benzene, since it contains a sulfur atom in its principal chain, has a high molecular weight and is cross-linked. It is, therefore, practically impossible to work the polymer directly. It is, therefore, deflocculated. Its deflocculation can be effected by a method which is employed for producing a chloroprene polymer of the type modified by sulfur. It is possible to use as a deflocculating agent tetraalkylthiuram disulfide and/or a thiol of formula R—SH or its ionized sulfenyl form of formula RS$^-$Me$^+$ where Me is an alkali cation or ammonium, and R is an alkyl group, an alkylaryl group, an arylcarbonyl group, an alkylcarboxyl group, an alkylnaphthyl or naphthyl group, an arylthiazole or thiazole group or a sodium salt thereof, an arylimidazole or imidazole group, or an alkylxanthate group having from 2 to 15 carbon atoms in a straight or branched chain. It is also possible to add a deflocculation accelerator selected from, for example, a formaldehyde sulfoxylate salt, an inorganic thiosulfate, a monosulfide, a polysulfide, an amine compound and a morpholine compound. The quantity of the deflocculating agent or a mixture of the deflocculating agent and the deflocculation accelerator which may be added to the polymer latex for its deflocculation is in the range of from 0.1 to 5.0% by weight of the monomer. The polymer is generally deflocculated at a temperature of from 20° C. to 60° C. until its viscosity reaches a desired level. The tetraalkylthiuram disulfides which can be used for deflocculation include, for example, tetraethylthiuram disulfide and tetrabutylthiuram disulfide.

The resulting chloroprene polymer may be formed into chips by a customary process for separation and drying. The process may, for example, include steam stripping the unreacted monomers from the polymer latex at a reduced pressure, freezing, separation and drying.

The invention will now be described mode specifically with reference to several examples, which are not intended to limit the scope of this invention. The cyclic polysulfide compounds (I) used in the examples were synthesized in accordance with reactions (1) and (2).

$$HS-R-SH + 2(CH_3)_3SiCl \longrightarrow (CH_3)_3SiS-R-SSi(CH_3)_3 \quad (1)$$

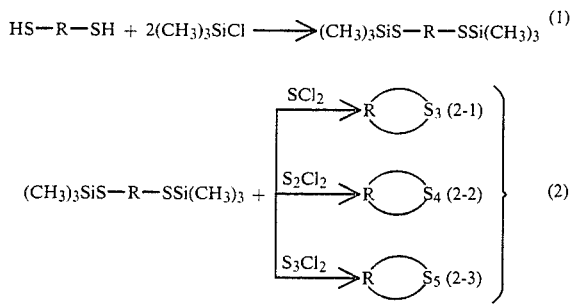

(2)

The compounds were identified by ultraviolet absorption spectroscopy, nuclear magnetic resonance absorption spectroscopy, and mass analysis.

EXAMPLE 1

A monomer solution containing 1,2,3,4-tetrathiacyclohexane and an emulsifier solution were mixed under stirring in a nitrogen atmosphere and the mixture was heated to 40° C. The monomer and emulsifier solutions were of the following composition.

|  | parts by weight |
|---|---|
| Monomer Solution: | |
| Chloroprene | 100 |
| 2,6-Di-tert-butyl-p-cresol | 0.01 |
| 1,2,3,4-Tetrathiacyclohexane | 1.0 |
| Emulsifier Solution: | |
| Disproportionated potassium rosinate | 5.0 |
| Sodium salt of the condensation product of naphthalenesulfonic acid and formaldehyde | 0.8 |
| Sodium hydroxide | 0.2 |
| Trisodium phosphate | 0.7 |
| Distilled water | 130 |

A polymerization catalyst solution of the following composition was added to the mixture of the monomer and emulsifier solutions by a pump at a specific rate to start the polymerization.

|  | parts by weight |
|---|---|
| Potassium persulfate | 1.0 |
| Sodium anthraquinone β-sulfonate | 0.1 |
| Distilled water | 50 |

The polymerization was continued until a conversion degree of 80% was reached, and a polymerization inhibitor solution of the following composition was then added to discontinue the polymerization.

|  | parts by weight |
|---|---|
| Dimethylammonium dithiocarbamate | 0.3 |
| Distilled water | 4.0 |

The resulting chloroprene latex was poured in methanol, removed therefrom, and dried. The resulting polymer was immersed in benzene at 23° C. and examined for its benzene insoluble portion after 40 hours. The results are shown in Table 1.

A deflocculating solution of the following composition was then added to the polymer and it was subjected to 5 hours of deflocculation at 40° C.

|  | parts by weight |
|---|---|
| Tetraethylthiuram disulfide | 1.6 |
| Thiodiphenylamine | 0.01 |
| 2,6-Di-tert-butyl-p-cresol | 0.05 |
| Chloroprene | 6.0 |
| Sodium lauryl sulfate | 0.2 |
| Distilled water | 2.0 |

The unreacted chloroprene was removed from the deflocculated latex by a customary steam stripping method, and a chloroprene polymer was obtained therefrom by a customary freeze drying method. Table 1 shows the quantity of the benzene insoluble portion of the polymer and the sulfur content of the polymer purified by reprecipitation.

A mixture containing the polymer and prepared in accordance with the recipe shown in Table 2 was kneaded by rolls and subjected to 40 minutes of press vulcanization at 150° C. to form a vulcanized rubber sheet. Its physical properties were examined in accordance with the procedures specified by Japanese Industrial Standard JIS 6301. The vulcanized product was also treated for thermal aging resistance. It was heat treated at 100° C. for 70 hours in a test tube and its tensile strength and hardness were examined. The results are shown in Table 3.

EXAMPLE 2

The procedures of Example 1 were repeated for the production of a chloroprene polymer, except that the quantity of 1,2,3,4-tetrathiacyclohexane in the monomer solution was increased to 1.5 parts by weight. The procedures of Example 1 were followed for examining the benzene insoluble portion of the polymer, its sulfur content and the physical properties of the vulcanized polymer. The results are shown in Tables 1 and 3.

EXAMPLE 3

The procedures of Example 1 were repeated for the production of a chloroprene polymer, except that 96 parts by weight of chloroprene and 4 parts by weight of 2,3-dichlorobutadiene were employed as the monomers. The results are shown in Tables 1 and 3.

EXAMPLE 4

The procedures of Example 1 were repeated for the production of a chloroprene polymer, except that 2.0 parts by weight of 1,2,3,4-tetrathia-7,10,13-trioxycyclopentadecane were employed as the cyclic polysulfide compound. The results are shown in Tables 1 and 3.

EXAMPLE 5

The procedures of Example 1 were repeated for the production of a chloroprene polymer, except that 2.0 parts by weight of 1,2,3-trithia-6,9,12-trioxytetradecane were employed as the cyclic polysulfide compound. The results are shown in Tables 1 and 3.

EXAMPLE 6

The procedures of Example 1 were repeated for the production of a chloroprene polymer, except that 2.0 parts by weight of 1,2,3,4,5-pentathia-8,11,14-trioxycyclohexadecane were employed as the cyclic polysulfide compound. The results are shown in Table 1 and 3.

COMPARATIVE EXAMPLE 1

The procedures of Example 1 were repeated for the production of a chloroprene polymer and the examination of its benzene insoluble portion and sulfur content and the physical properties of the vulcanized polymer, except that the quantity of 1,2,3,4-tetrathiacyclohexane in the monomer solution was decreased to 0.08 part by weight. The results are shown in Table 1.

COMPARATIVE EXAMPLE 2

The chloroprene polymer same as Reference Example 1 hereinafter described and 1,2,3,4-tetrathiacyclohexane were prepared in accordance with the recipe shown in Table 2. The rubber was kneaded by rolls and the cure curve of the rubber was measured at 150° C. using a MONSANTO RHEOMETER R-100. The value of torque did not increase during 40 minutes. This shows that the cyclic polysulfide is not effective as the curing agent to the chloroprene rubber of the type not modified by sulfur.

TABLE 1

| Example No. | Benzene Insoluble Portion before Deflocculation (wt %) | Benzene Insoluble Portion after Deflocculation (wt %) | Sulfur Content (wt %) |
|---|---|---|---|
| 1 | 95.9 | 1.0 | 0.56 |
| 2 | 96.2 | 0.6 | 0.82 |
| 3 | 95.8 | 0.9 | 0.55 |
| 4 | 96.3 | 1.1 | 0.39 |
| 5 | 95.2 | 1.3 | 0.34 |
| 6 | 94.9 | 0.8 | 0.48 |
| Comparative Example 1 | 96.5 | 87.1 | Less than 0.1 |

TABLE 2

| | Examples 1 to 6 and Reference Example 2 (parts by weight) | Reference Example 1 (parts by weight) | Comparative Example 2 (parts by weight) |
|---|---|---|---|
| Polymer | 100 | 100 | 100 |
| Magnesium oxide | 4 | 4 | 4 |
| Zinc oxide | 5 | 5 | 5 |
| Ethylene thiourea | — | 0.5 | — |
| 1,2,3,4-Tetrathiacyclohexane | — | — | 0.5 |

REFERENCE EXAMPLES 1 AND 2

"SKYPRENE B-30", which is a trademark of Toyo Soda Manufacturing Co., Ltd. for a chloroprene polymer of the type not modified by sulfur, was prepared in accordance with the recipe shown in Table 2. The rubber was kneaded by rolls and subjected to 40 minutes of press vulcanization at 150° C. to form a vulcanized rubber sheet. Its physical properties are shown in Table 3 (Reference Example 1).

Reference Example 2 is equal to Reference Example 1, except for the use of "SKYPRENE R-22", which is a trademark of Toyo Soda Manufacturing Co., Ltd. for a chloroprene polymer of the type modified by sulfur. The physical properties of the vulcanized rubber sheet are shown in Table 3.

As is obvious from Table 3, the vulcanized products of the chloroprene polymers according to this invention are superior in thermal aging resistance to the conventional vulcanized chloroprene polymers of the types modified and not modified by sulfur, and in tensile strength of the conventional vulcanized chloroprene polymer of the type not modified by sulfur, while they are comparable in tensile strength to the conventional vulcanized chloroprene polymer of the type modified by sulfur.

TABLE 3

| | Example | | | | | | Reference Example | |
|---|---|---|---|---|---|---|---|---|
| | 1 | 2 | 3 | 4 | 5 | 6 | 1** | 2*** |
| Tensile Strength (kg/cm$^2$) | 251 | 240 | 245 | 218 | 210 | 230 | 161 | 272 |
| Elongation at Rupture (%) | 925 | 750 | 820 | 790 | 830 | 800 | 686 | 839 |

TABLE 3-continued

|  | Example | | | | | | Reference Example | |
|---|---|---|---|---|---|---|---|---|
|  | 1 | 2 | 3 | 4 | 5 | 6 | 1** | 2*** |
| 100% Modulus (kg/cm$^2$) | 11 | 13 | 12 | 12 | 11 | 13 | 10 | 13 |
| Hardness (JIS-A) | 48 | 52 | 52 | 53 | 49 | 53 | 46 | 54 |
| Permanent Compressive Strain (%) | 38 | 39 | 37 | 35 | 33 | 39 | 32 | 54 |
| Thermal Aging Resistance* | | | | | | | | |
| Change in Tensile Strength (%) | −17 | −22 | −20 | −27 | −23 | −30 | −56 | −43 |
| Change in Elongation at Rupture (%) | −16 | −18 | −15 | −14 | −13 | −20 | −38 | −28 |
| Change in 100% Modulus (%) | +10 | +11 | +10 | +8 | +8 | +11 | +50 | +15 |
| Change in Hardness (points) | +3 | +4 | +3 | +2 | +2 | +3 | +4 | +3 |

*Tested by aging at 100° C. for 70 hours in a test tube.
**SKYPRENE B-30
***SKYPRENE R-22

While the invention has been described in detail and with reference to specific embodiments thereof, it will be apparent to one skilled in the art that various changes and modifications can be made therein without departing from the spirit and scope thereof.

What is claimed is:

1. A process for producing a chloroprene polymer, comprising
subjecting chloroprene to aqueous emulsion polymerization in the presence of a cyclic polysulfide compound which is present in a quantity equal to at least 0.1% by weight of the weight of said chloroprene to form a chloroprene polymer, and deflocculating said polymer.

2. A process as set forth in claim 1, wherein said quantity of said compound is in the range from 0.1 to 10% by weight of the weight of said chloroprene.

3. A process as set forth in claim 1, wherein said cyclic polysulfide compound is represented by formula (I)

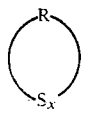

wherein x is an integer of from 3 to 5, and R is a unit having its terminal carbon atoms bonded to sulfur atoms.

4. A process as set forth in claim 1, wherein said cyclic polysulfide compound is selected from the group consisting of 1,2-dithiane, 1,2,3-trithiane, 1,2,3,4-tetrathiacyclohexane, 1,2,3-trithia-6,9,12-trioxytetradecane, 1,2,3-trithia-6,9-dioxycycloundecane, 1,2,3-trithia-6-oxycyclooctane, 1,2-dithia-5,8,11-trioxycyclododecane, 1,2,3,4-tetrathia-7,10,13-trioxycyclopentadecane, 1,2,3,4,5-pentathia-8,11,14-trioxycyclohexadecane and 1,2,3,4,5,6-hexathia-9,12,15-trioxycycloheptadecane.

5. A process as set forth in claim 1, wherein said deflocculating is performed by a deflocculating agent added to said polymer in a quantity in the range of from 0.1 to 5.0% by weight thereof.

6. A process as set forth in claim 2, wherein said deflocculating is performed by a deflocculating agent added to said polymer in a quantity in the range of from 0.1 to 5.0% by weight thereof.

7. A process as set forth in claim 3, wherein said deflocculating is performed by a deflocculating agent added to said polymer in a quantity in the range of from 0.1 to 5.0% by weight thereof.

8. A process as set forth in claim 4, wherein said deflocculating is performed by a deflocculating agent added to said polymer in a quantity in the range of from 0.1 to 5.0% by weight thereof.

9. A process as set forth in claim 5, wherein said deflocculating agent is selected from the group consisting of tetraalkylthiuram disulfides, thiols of formula R—SH and the ionized sulphenyl forms thereof represented by formula RS$^-$Me$^+$, where Me is an alkali cation or ammonium, and R is an alkyl group, an alkylaryl group, an arylcarbonyl group, an alkylcarboxyl group, an alkylnaphthyl or naphthyl group, an arylthiazole or thiazole group or a sodium salt thereof, an arylimidazole or imidazole group, or an alkylxanthate group having from 2 to 15 carbon atoms in a straight or branched chain.

10. A process as set forth in claim 6, wherein said deflocculating agent is selected from the group consisting of tetraalkylthiuram disulfides, thiols of formula R—SH and the ionized sulphenyl forms thereof represented by formula RS$^-$Me$^+$, where Me is an alkali cation or ammonium, and R is an alkyl group, an alkylaryl group, an arylcarbonyl group, an alkylcarboxyl group, an alkylnaphthyl or naphthyl group, an arylthiazole or thiazole group or a sodium salt thereof, an arylimidazole or imidazole group, or an alkylxanthate group having from 2 to 15 carbon atoms in a straight or branched chain.

11. A process as set forth in claim 7, wherein said deflocculating agent is selected from the group consisting of tetraalkylthiuram disulfides, thiols of formula R—SH and the ionized sulphenyl forms thereof represented by formula RS$^-$Me$^+$, where Me is an alkali cation or ammonium, and R is an alkyl group, an alkylaryl group, an arylcarbonyl group, an alkylcarboxyl group, an alkylnaphthyl or naphthyl group, an arylthiazole or thiazole group or a sodium salt thereof, an arylimidazole or imidazole group, or an alkylxanthate group having from 2 to 15 carbon atoms in a straight or branched chain.

12. A process as set forth in claim 8, wherein said deflocculating agent is selected from the group consisting of tetraalkylthiuram disulfides, thiols of formula R—Sh and the ionized sulphenyl forms thereof represented by formula RS$^-$Me$^+$, where Me is an alkali cation or ammonium, and R is an alkyl group, an alkylaryl group, an arylcarbonyl group, an alkylcarboxyl group, an alkylnaphthyl or naphthyl group, an arylthiazole or thiazole group or a sodium salt thereof, an arylimidazole or imidazole group, or an alkylxanthate group having from 2 to 15 carbon atoms in a straight or branched chain.

13. A process as set forth in claim 1, wherein said aqueous emulsion polymerization is conducted to a polymerization degree of 65 to 95% in the presence of said cyclic polysulfide.

* * * * *